US012592782B2

(12) United States Patent
Arikawa

(10) Patent No.: US 12,592,782 B2
(45) Date of Patent: Mar. 31, 2026

(54) COMMUNICATION SYSTEM, RECEIVER, EQUALIZATION SIGNAL PROCESSING CIRCUIT, EQUALIZATION SIGNAL PROCESSING METHOD, AND PROGRAM

(71) Applicant: NEC Corporation, Tokyo (JP)

(72) Inventor: Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 257 days.

(21) Appl. No.: 18/430,846

(22) Filed: Feb. 2, 2024

(65) Prior Publication Data

US 2024/0283546 A1 Aug. 22, 2024

(30) Foreign Application Priority Data

Feb. 20, 2023 (JP) ................................. 2023-023898

(51) Int. Cl.
H04B 10/69 (2013.01)
H04B 10/2513 (2013.01)

(52) U.S. Cl.
CPC ..... H04B 10/6971 (2013.01); H04B 10/2513 (2013.01)

(58) Field of Classification Search
CPC ........................ H04B 10/6971; H04B 10/2513
USPC ........................................................ 398/208
See application file for complete search history.

(56) References Cited

U.S. PATENT DOCUMENTS 7,171,436 B2 * 1/2007 Egelmeers ......... H03H 21/0027
708/322
7,466,750 B2 * 12/2008 Kim ..................... H04B 7/0842
375/232

8,619,897 B2 * 12/2013 Azenkot .................. H04B 3/23
379/381
2010/0119241 A1 * 5/2010 Yang .................. H04B 10/6971
398/208
2012/0236926 A1 * 9/2012 Bourdoux ......... H04L 25/03159
375/233
2013/0302041 A1 * 11/2013 Matsui .............. H04B 10/6971
398/208
2018/0226954 A1 * 8/2018 Valero ................ H03H 21/0027

OTHER PUBLICATIONS

S. Haykin, "Adaptive filter theory 4th edition", Prentice Hall, 2002, chap. 7.
S. Randel et al., "Complexity analysis of adaptive frequency-domain equalization for MIMO-SDM transmission", ECOC 2013, Th.2. C.4.

* cited by examiner

*Primary Examiner* — Dalzid E Singh
(74) *Attorney, Agent, or Firm* — Sughrue Mion, PLLC

(57) ABSTRACT

A frequency domain filter receives an input signal in a frequency domain being blocked by an overlap-save method. The frequency domain filter multiplies the input signal in the frequency domain by a coefficient for each frequency. A coefficient updating unit adaptively updates a filter coefficient of the frequency domain filter. A constraint operation unit performs an operation of a constraint on a filter coefficient of the frequency domain filter in such a way as not to be affected by distortion caused by wraparound from both ends of a block to the output signal. A frequency at which the constraint operation unit performs the operation of the constraint is lower than a frequency at which the coefficient updating unit adaptively updates the filter coefficient of the frequency domain filter.

16 Claims, 7 Drawing Sheets

X POLARIZATION

X POLARIZATION

COMMUNICATION SYSTEM, RECEIVER, EQUALIZATION SIGNAL PROCESSING CIRCUIT, EQUALIZATION SIGNAL PROCESSING METHOD, AND PROGRAM

INCORPORATION BY REFERENCE

This application is based upon and claims the benefit of priority from Japanese patent application No. 2023-023898, filed on Feb. 20, 2023, the disclosure of which is incorporated herein in its entirety by reference.

TECHNICAL FIELD

The present disclosure relates to a communication system, a receiver, an equalization signal processing circuit, an equalization signal processing method, and a program.

BACKGROUND ART

Since introduction of so-called digital coherent technique, which combines coherent reception and digital signal processing, in optical fiber communication, flexible receiver side equalization signal processing by digital signal processing has become possible. In the receiver side equalization signal processing, for example, chromatic dispersion accumulated in an optical fiber transmission line is collectively compensated in a receiver side apparatus.

In the optical fiber communication, a high-speed and large-capacity signal is generally handled. For this reason, high throughput is also required for digital signal processing handling the optical fiber communication. Therefore, magnitude of a calculation amount required for the digital signal processing often becomes a problem. A response of an adaptive equalization filter is adaptively controlled according to a state of a transmission path. The adaptive equalization filter is one of important elements of the receiver side equalization signal processing in the optical fiber communication, and efficiency of the calculation amount is also required for the adaptive equalization filter.

When the adaptive equalization filter compensates for an effect with a large time spread, a large filter capable of expressing a response with a large time spread is used for the adaptive equalization filter, and in the adaptive equalization filter, the calculation amount required for compensation increases. As one of methods for efficiently compensating for the effect with large time spread, adoption of a frequency domain filter has been considered. In a frequency domain, a convolution arithmetic operation of a filter response to the input signal in a time domain can be handled as simple multiplication. In addition, converting a time domain signal into the frequency domain can be efficiently performed by fast Fourier transform (FFT). For this reason, when a time spread of the response is large, a required calculation amount of the frequency domain filter is reduced as compared with that of a time domain filter.

In the frequency domain filter, a signal is processed in a unit of blocks constituted by a plurality of samples. Herein, a case where a block of an input signal of a frequency domain signal is expressed by the following expression 1 and a block of an output signal is expressed by the following expression 2 will be considered.

$$(x[0], x[1], \dots , x[M_x - 1])^T \tag{1}$$

$$(y[0], y[1], \dots , y[M_y - 1])^T \tag{2}$$

In the above expressions 1 and 2, each of $M_x$ and $M_y$ is a size of an input block and a size of an output block, respectively.

A finite impulse response of the filter in the time domain is assumed as follows.

$$(h[0], h[1], \dots , h[M - 1])^T \tag{3}$$

In the above expression 3, M is a length of the finite impulse response of the filter. From a convolution relationship of the finite impulse response, a relationship of the following equation 4 is established between the block of the input signal and the block of the output signal.

$$
\begin{pmatrix} y[k] \\ \vdots \\ y[k - M_y + 1] \end{pmatrix} =
\tag{4}
$$

$$
\begin{pmatrix} h[0] & \dots & h[M-1] & 0 & \dots & 0 \\ 0 & \ddots & & & \ddots & \vdots \\ \vdots & & & & & 0 \\ 0 & \dots & 0 & h[0] & \dots & h[M-1] \end{pmatrix}
\begin{pmatrix} x[k] \\ \vdots \\ x[k - M_x + 1] \end{pmatrix}
$$

From the convolution relationship, $M_y = M_x - M + 1$. The above equation 4 is described as follows.

$$y = H_- x \tag{5}$$

In the above equation 5, $H_-$ is a non-square matrix, but when $H_-$ is extended in such a way as to be a circulant matrix and squared, a relationship of the following equation 6 is acquired.

$$
\begin{pmatrix} y[k] \\ \vdots \\ y[k - M_y + 1] \\ \tilde{y}[k - M_y] \\ \vdots \\ \tilde{y}[k - M_x + 1] \end{pmatrix} =
\tag{6}
$$

$$
\begin{pmatrix} h[0] & \dots & & h[M-1] & 0 & \dots & 0 \\ 0 & \ddots & & & \ddots & \ddots & \vdots \\ \vdots & & & & & & 0 \\ 0 & \dots & 0 & h[0] & \dots & & h[M-1] \\ h[M-1] & 0 & \dots & & 0 & h[0] & \dots & h[M-2] \\ \vdots & \ddots & \ddots & & & \ddots & \ddots & \vdots \\ h[1] & \dots & h[M-1] & 0 & & \dots & 0 & h[0] \end{pmatrix}
$$

$$
\begin{pmatrix} x[k] \\ \vdots \\ x[k - M_x + 1] \end{pmatrix}
$$

The above equation 6 is described as follows.

$$y_+ = \begin{pmatrix} y \\ y^{\sim} \end{pmatrix} = H_+ x \tag{7}$$

In the above equation 7, since $H_+$ is a circulant matrix, $H_+$ can be diagonalized by using a discrete Fourier transform (DFT) matrix D as in the following equation 8.

$$H_+ = D^{\dagger} \Lambda D \tag{8}$$

Herein, the following is established, $$\Lambda = \mathrm{diag}(H[0], \ldots , H[M_x - 1]) \tag{9}$$

and the following is also established.

$$H = \begin{pmatrix} H[0] \\ \vdots \\ H[M_x - 1] \end{pmatrix} = D \begin{pmatrix} h[0] \\ \vdots \\ h[M-1] \\ 0 \\ \vdots \\ 0 \end{pmatrix} = D \begin{pmatrix} h \\ 0 \end{pmatrix} = Dh_+ \tag{10}$$

Therefore, the following is established, $$y_+ = D^{\dagger} \Lambda D x \tag{11}$$

when D is multiplied from a left in an equation 11, the following is established.

$$D y_+ = \Lambda D x \tag{12}$$

Herein, $D^{-1} = D^{\dagger} = D^*$ is used.

Multiplying a certain signal block, i.e., a vector, by D means conversion into the frequency domain. Assuming that frequency domain representation of each of x and $y_+$ is X and $Y_+$, respectively, the following is established.

$$Y_+ = \Lambda X = H \circ X \tag{13}$$

This is an arithmetic operation of a finite impulse response h in the frequency domain, and His the frequency domain representation of h with appropriate 0 inserted as previously described. Thus, in the frequency domain, convolution of the finite impulse response h becomes a simple multiplication for each frequency of the frequency domain representation. Since the conversion of a signal into the frequency domain can be efficiently achieved by the FFT, the calculation amount is reduced.

By converting an output $Y_+$ of the frequency domain filter into the time domain, $y_+$ is acquired. In the equation 7 above, $y^{\sim}$ is a part added at a time when $H_-$ is extended in such a way as to be a circulant matrix, and includes wraparound from both ends of the input signal block. Therefore, in the frequency domain filter by a general overlap-save method, only y is left from $y_+$ acquired by converting $Y_+$ into a signal of the time domain, and $y^{\sim}$ is removed. Since the output signal block is shorter than the input signal block by an amount corresponding to $y^{\sim}$, the input signal is divided into blocks with overlapping associated to the previous and subsequent blocks.

As a related art, Non Patent Literature 1 (S. Haykin, Adaptive filter theory 4th edition, (Prentice Hall, 2002, chap. 7)) discloses an adaptive frequency domain filter in which a response of a frequency domain filter is adaptively controlled. FIG. 8 illustrates an example of the adaptive frequency domain filter described in Non Patent Literature 1. In an adaptive frequency domain filter 600 illustrated in FIG. 8, a block conversion unit 601 converts a time domain input signal into a signal of a block having a certain length for conversion into the frequency domain. In other words, the block conversion unit 601 performs serial/block conversion on the time domain input signal. In the block conversion, the above-described overlap is performed on the previous and subsequent blocks.

An FFT 602 converts a blocked input signal into a frequency domain signal. A frequency domain filter 603 multiplies an input signal by a filter coefficient for each frequency. An inverse FFT (IFFT) 604 converts an output signal of the frequency domain filter 603 from a signal in the frequency domain to a signal in a time domain. A serial conversion unit 605 converts a blocked signal converted into a signal in the time domain by the IFFT 604 into a serial signal. In other words, the serial conversion unit 605 performs block/serial conversion on an output signal of the IFFT 604. In the conversion into a serial signal, the serial conversion unit 605 leaves only a domain of the output signal of the IFFT 604 not being affected by wraparound at both ends of a block, and removes other domains. A coefficient of the frequency domain filter 603 is adaptively controlled by using an input signal of the frequency domain filter 603 and an output signal of the serial conversion unit 605.

When a least mean square (LMS) algorithm is used for updating the filter coefficient, the coefficient of the frequency domain filter 603 is updated as follows.

$$H \rightarrow H + 2\alpha Dc \circ \left( D^{-1} \left( X^* \circ D \begin{pmatrix} e \\ 0 \end{pmatrix} \right) \right) \tag{14}$$

In the above expression 14, $\alpha$ is a step size, and e is a difference between an output signal y and a desired state d, as expressed by the following equation 15.

$$e = d - y \tag{15}$$

In the adaptive frequency domain filter 600, an error calculation unit 611 calculates an error e expressed by the above equation 15. When an input signal to the frequency domain filter is two-times oversampling and y is a time domain signal of two-times oversampling, the desired state d is expressed by the following equation 16.

$$d[k] = \begin{cases} \text{desired symbol} & (k\text{: symbol timings}) \\ 0 & (k\text{: transition timings}) \end{cases} \tag{16}$$

In case of data-aided LMS, a desired symbol is determined by a known training signal. A zero insertion unit 612 concatenates a zero vector having the same magnitude as the y~ to the above error e, and outputs a vector (e 0)$^T$. An FFT 613 multiplies the vector (e 0)$^T$ by the DFT matrix D, and converts an error signal vector into a signal D(e 0)$^T$ in the frequency domain.

A complex conjugate calculation unit 614 calculates complex conjugate X* of an input frequency domain signal X being output from the FFT 602. An Hadamard product calculation unit 615 calculates an Hadamard product of the complex conjugate X* of the input frequency domain signal and the error signal vector converted into a signal in the frequency domain by the FFT 613. The Hadamard product calculation unit 615 outputs a calculation result X*∘D(e 0)$^T$ of the Hadamard product.

The calculation result of the Hadamard product becomes a coefficient update amount for the frequency domain filter coefficient H by a stochastic gradient descent method. However, as described above, there is a constraint that His a frequency domain representation of (h 0)$^T$. When this constraint is not satisfied, even when y~ is removed from y$_+$, an effect of distortion caused by wraparound from both ends of the block leaves in y.

Therefore, in a general adaptive frequency domain filter as described in Non Patent Literature 1, the coefficient update amount is converted into a signal in the time domain in an IFFT 616, and a part of the coefficient update amount in the time domain is replaced with zero in a zero replacement unit 617. In other words, $$c[k] = \begin{cases} 1 & (k = 0, 1, \ldots, M - 1) \\ 0 & (k = M, \ldots, M_x - 1) \end{cases} \quad (17)$$

by using an above equation, c∘(D$^{-1}$(X*∘D(e 0)$^T$)) is calculated. An FFT 618 converts the signal having been replaced with zero into a signal in the frequency domain, i.e., a coefficient update amount in the frequency domain. An output signal of the FFT 618 appears in a second term on a right side of the filter coefficient update expression expressed by the above expression 14. A coefficient updating unit 619 multiplies an output of the FFT 618 by the step size a, and updates the filter coefficient of the frequency domain filter 603. Although the above is a description of a case where the input/output signal is one-dimensional, the above description is easily extended to a case where a filter is a multi-input multi-output (MIMO) filter.

As described above, in a general adaptive frequency domain filter, a coefficient update amount is converted into a time domain, an appropriate domain is replaced with zero, and thereby the final coefficient update amount of the frequency domain filter is calculated by converting into the frequency domain again. By doing so, it is possible to prevent an effect of distortion caused by the wraparound from both ends of the block to the output signal from leaving. This is referred to as a constraint on the coefficient, or the like.

SUMMARY

However, in order to perform the above constraint, conversion of the coefficient update amount into the time domain and conversion again into the frequency domain is required, and an IFFT and an FFT are required each time the coefficient update is performed. This leads to a non-negligible increase in calculation amount in the coefficient update of the adaptive frequency domain filter. In this regard, Non Patent Literature 2 (S. Randel et al., "Complexity analysis of adaptive frequency-domain equalization for MIMO-SDM transmission", ECOC 2013, Th.2. C.4.) discloses a method of performing no operation of a constraint on the coefficient update amount. In Non Patent Literature 2, an increase in calculation amount caused by the IFFT and the FFT due to the operation of the constraint does not occur. However, in the method described in Non Patent Literature 2, the effect of the distortion caused by the wraparound from both ends of the block to the output signal leaves as it is. For this reason, the method described in Non Patent Literature 2 is not a method of being capable of performing at all times.

In view of the above circumstances, an object of the present disclosure is to provide a communication system, a receiver, an equalization signal processing circuit, an equalization signal processing method, and a program that are capable of reducing a calculation amount required for performing coefficient update of an adaptive frequency domain filter while suppressing an effect of distortion caused by wraparound from both ends of a block to an output signal.

In order to achieve the above-described object, in a first example aspect of the present disclosure, an equalization signal processing circuit includes: a frequency domain filter configured to multiply an input signal in a frequency domain being blocked by an overlap-save method by a coefficient for each frequency; a coefficient updating unit configured to adaptively update a filter coefficient of the frequency domain filter, based on an input signal to the frequency domain filter and an output signal of the equalization signal processing circuit, and a predetermined state of the output signal of the equalization signal processing circuit; and a constraint operation unit configured to perform an operation of a constraint on a filter coefficient of the frequency domain filter in such a way as not to be affected by distortion caused by wraparound from both ends of a block to the output signal. In the equalization signal processing circuit, a frequency at which the constraint operation unit performs the operation of the constraint is lower than a frequency at which the coefficient updating unit adaptively updates the filter coefficient.

In a second example aspect of the present disclosure, a receiver includes: a detector configured to coherently receive a signal being transmitted from a transmitter via a transmission path; and an equalization signal processing circuit configured to perform equalization signal processing on the coherently received input signal. The equalization signal processing circuit includes: a frequency domain filter configured to multiply the input signal in a frequency domain being blocked by an overlap-save method by a coefficient for each frequency; a coefficient updating unit configured to adaptively update a filter coefficient of the frequency domain filter, based on an input signal to the frequency domain filter and an output signal of the equalization signal processing circuit, and a predetermined state of the output signal of the equalization signal processing circuit; and a constraint operation unit configured to perform an operation of a constraint on a filter coefficient of the frequency domain filter in such a way as not to be affected by distortion caused by wraparound from both ends of a block to the output signal. In the equalization signal processing circuit, a frequency at which the constraint operation unit performs the operation of the constraint is lower than a frequency at which the coefficient updating unit adaptively updates the filter coefficient.

In a third example aspect of the present disclosure, a communication system includes: a transmitter configured to transmit a signal via a transmission path; and a receiver configured to receive the transmitted signal. The receiver includes: a detector configured to coherently receive a signal being transmitted from the transmitter; and an equalization signal processing circuit configured to perform equalization signal processing on the coherently received input signal. The equalization signal processing circuit includes: a frequency domain filter configured to multiply the input signal in a frequency domain being blocked by an overlap-save method by a coefficient for each frequency; a coefficient updating unit configured to adaptively update a filter coefficient of the frequency domain filter, based on an input signal to the frequency domain filter and an output signal of the equalization signal processing circuit, and a predetermined state of the output signal of the equalization signal processing circuit; and a constraint operation unit configured to perform an operation of a constraint on a filter coefficient of the frequency domain filter in such a way as not to be affected by distortion caused by wraparound from both ends of a block to the output signal. In the equalization signal processing circuit, a frequency at which the constraint operation unit performs the operation of the constraint is lower than a frequency at which the coefficient updating unit adaptively updates the filter coefficient.

In a fourth example aspect of the present disclosure, an equalization signal processing method of performing equalization signal processing is provided. The equalization signal processing includes: multiplying an input signal in a frequency domain being blocked by an overlap-save method by a coefficient for each frequency in a frequency domain filter; adaptively updating a filter coefficient of the frequency domain filter, based on an input signal to the frequency domain filter and an output signal of the equalization signal processing, and a predetermined state of the output signal of the equalization signal processing; and performing an operation of a constraint on a filter coefficient of the frequency domain filter at a frequency lower than a frequency at which the filter coefficient is adaptively updated, in such a way as not to be affected by distortion caused by wraparound from both ends of a block to the output signal.

In a fifth example aspect of the present disclosure, a program for causing a processor to execute equalization signal processing is provided. The equalization signal processing includes: multiplying an input signal in a frequency domain being blocked by an overlap-save method by a coefficient for each frequency in a frequency domain filter; adaptively updating a filter coefficient of the frequency domain filter, based on an input signal to the frequency domain filter and an output signal of the equalization signal processing, and a predetermined state of the output signal of the equalization signal processing; and performing an operation of a constraint on a filter coefficient of the frequency domain filter at a frequency lower than a frequency at which the filter coefficient is adaptively updated, in such a way as not to be affected by distortion caused by wraparound from both ends of a block to the output signal.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figures 1, 2:
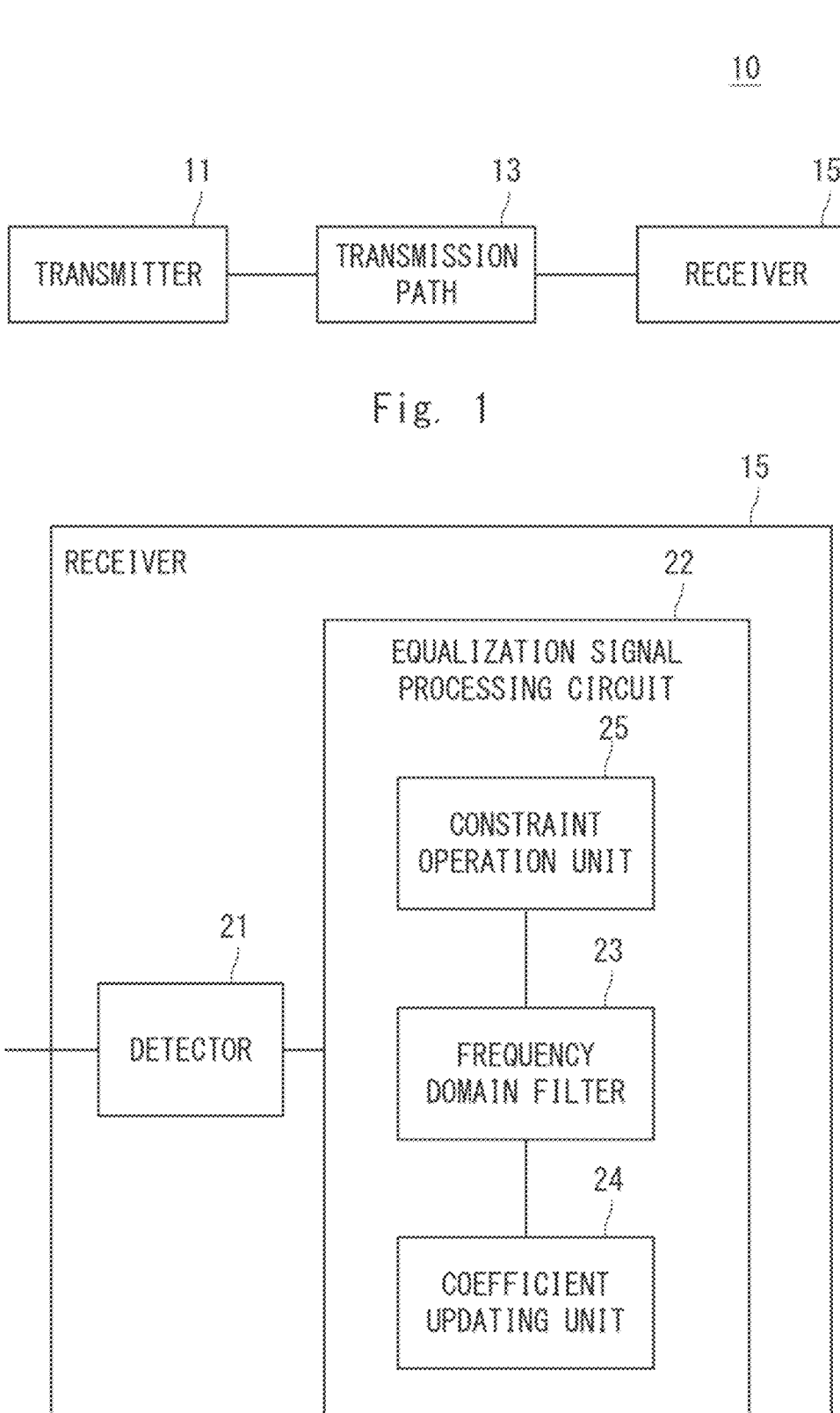
FIG. 1 is a block diagram schematically illustrating a configuration example of a communication system according to the present disclosure.
FIG. 2 is a block diagram illustrating a schematic configuration example of a receiver according to the present disclosure.

Prior to the description of an example embodiment of the present disclosure, an outline of the present disclosure will be described. FIG. 1 schematically illustrates a configuration example of a communication system according to the present disclosure. A communication system 10 includes a transmitter 11, and a receiver 15. The transmitter 11 and the receiver 15 are connected to each other via a transmission path 13. The transmitter 11 transmits a signal via the transmission path 13. The receiver 15 receives a signal transmitted from the transmitter 11 via the transmission path 13.

FIG. 2 illustrates a schematic configuration example of the receiver 15. The receiver 15 includes a detector 21, and an equalization signal processing circuit 22. The detector 21 coherently receives a signal transmitted from the transmitter 11. A signal coherently received by the detector 21 is input to the equalization signal processing circuit 22 as an input signal. The equalization signal processing circuit 22 performs equalization signal processing on the input signal.

The equalization signal processing circuit 22 includes a frequency domain filter 23, a coefficient updating unit 24, and a constraint operation unit 25. The frequency domain filter 23 is input an input signal in a frequency domain being blocked by an overlap-save method. The frequency domain filter 23 multiplies an input signal in the frequency domain by a coefficient for each frequency. The coefficient updating unit 24 adaptively updates a filter coefficient of the frequency domain filter 23, based on an input signal to the frequency domain filter 23 and an output signal of the equalization signal processing circuit 22, and a predetermined state of the output signal of the equalization signal processing circuit 22.

The constraint operation unit 25 performs an operation of a constraint on the filter coefficient of the frequency domain filter 23 in such a way as not to be affected by distortion caused by wraparound from both ends of a block to an output signal. For example, the constraint operation unit 25 converts the filter coefficient of the frequency domain filter 23 into a filter coefficient in a time domain, and replaces, with zero, a domain of the converted filter coefficient that causes wraparound at both ends of a block of the input signal not being removed by the overlap-save method. The constraint operation unit 25 converts the filter coefficient in the time domain having been replaced with zero into a filter coefficient in the frequency domain, and sets the converted filter coefficient in the frequency domain to the frequency domain filter 23. In the equalization signal processing circuit 22, a frequency at which the constraint operation unit 25 performs the operation of the constraint is lower than a frequency at which the coefficient updating unit 24 adaptively updates the filter coefficient of the frequency domain filter 23.

In the present disclosure, the constraint operation unit 25 performs the operation of the constraint on the filter coefficient of the frequency domain filter 23 in such a way as not to be affected by distortion caused by the wraparound from both ends of the block to the output signal. The constraint operation unit 25 performs the operation of the constraint at the frequency lower than the frequency at which the coefficient updating unit 24 adaptively updates the filter coefficient of the frequency domain filter 23. By doing so, it is possible to reduce a calculation amount required for performing the coefficient update of the frequency domain filter 23, as compared with a case where the operation of the constraint is performed on a coefficient update amount of the filter coefficient, while suppressing an effect of distortion caused by the wraparound from both ends of the block to the output signal.

Note that, in the present disclosure, the equalization signal processing circuit 22 may include another filter in addition to the frequency domain filter 23 whose coefficient is adaptively controlled. For example, the equalization signal processing circuit 22 may include an equalization filter with a static coefficient, such as a chromatic dispersion compensation filter or a matched filter, before the frequency domain filter 23.

Hereinafter, the example embodiment of the present disclosure will be described in detail with reference to the drawings. Note that, the following description and the drawings are omitted and simplified as appropriate for clarity of description. In addition, in each of the following drawings, the same elements and the similar elements are denoted by the same reference signs, and redundant descriptions are omitted as necessary.

Figure 3:
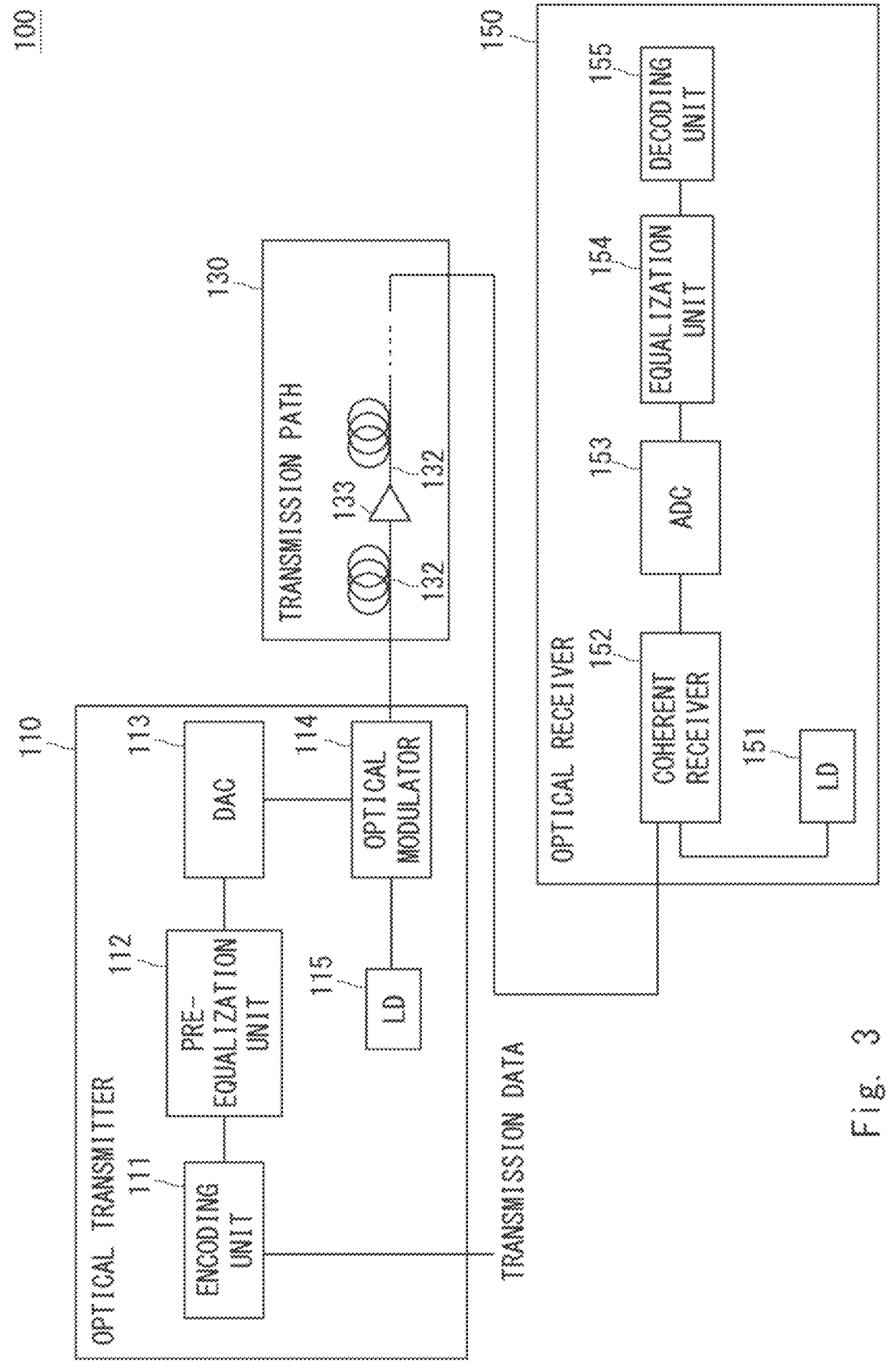
FIG. 3 is a block diagram illustrating a communication system according to one example embodiment of the present disclosure.

One example embodiment of the present disclosure will be described. FIG. 3 illustrates a communication system according to one example embodiment of the present disclosure. In the present example embodiment, it is assumed that the communication system is an optical fiber communication system that adopts a polarization multiplexing quadrature amplitude modulation (QAM) system and performs coherent reception. An optical fiber communication system 100 includes an optical transmitter 110, a transmission path 130, and an optical receiver 150. The optical fiber communication system 100 constitutes, for example, an optical submarine cable system. The optical fiber communication system 100 corresponds to the communication system 10 illustrated in FIG. 1. The optical transmitter 110 corresponds to the transmitter 11 illustrated in FIG. 1. The transmission path 130 corresponds to the transmission path 13 illustrated in FIG. 1. The optical receiver 150 corresponds to the receiver 15 illustrated in FIG. 1.

The optical transmitter 110 converts transmission data into a polarization multiplexed optical signal. The optical transmitter 110 includes an encoding unit 111, a pre-equalization unit 112, a digital analog converter (DAC) 113, an optical modulator 114, and a laser diode (LD) 115. The encoding unit 111 encodes the transmission data, and generates a signal sequence for optical modulation. In a case of the polarization multiplexing QAM system, the encoding unit 111 generates a total of four series of signals being an in-phase (I) component and a quadrature (Q) component of each of X polarization (first polarization) and Y polarization (second polarization), respectively. Note that, in FIG. 3, for the sake of simplification of the drawings, an encoded four-series signal is illustrated as one solid line. Hereinafter, one solid line illustrated in FIG. 3 may collectively represent a signal sequence having a predetermined number, as a physical entity.

The pre-equalization unit 112 performs pre-equalization for compensating for known distortion or the like of a device in the optical transmitter 110 in advance for the encoded four-series signal. The DAC 113 converts each of the four-series signals being subject to the pre-equalization into an analog electric signal. The LD 115 outputs continuous wave (CW) light. The optical modulator 114 modulates the CW light output from the LD 115 in response to the four-series signal output from the DAC 113, and generates an optical signal of polarization multiplexing QAM. The optical signal generated by the optical modulator 114, i.e., the polarization multiplexed optical signal is output to the transmission path 130.

The transmission path 130 transmits the polarization multiplexed optical signal output from the optical transmitter 110 to the optical receiver 150. The transmission path 130 includes an optical fiber 132, and an optical amplifier 133. The optical fiber 132 guides an optical signal transmitted from the optical transmitter 110. The optical amplifier 133 amplifies an optical signal, and compensates for a propagation loss in the optical fiber 132. The optical amplifier 133 is configured, for example, as an erbium doped fiber amplifier (EDFA). The transmission path 130 may include a plurality of optical fibers 132 and a plurality of optical amplifiers 133.

The optical receiver 150 receives an optical signal from the transmission path 130. The optical receiver 150 includes an LD 151, a coherent receiver 152, an analog digital converter (ADC) 153, an equalization unit 154, and a decoding unit 155. In the optical receiver 150, circuits such as the equalization unit (equalizer) 154 and the decoding unit (decoder) 155 may be configured by using a device such as a digital signal processor (DSP), for example.

The LD 151 outputs CW light as local oscillator light. In the present example embodiment, the coherent receiver 152 is configured as a polarization diversity type coherent receiver. The coherent receiver 152 performs coherent detection on an optical signal transmitted through the transmission path 130, by using the CW light output from the LD 151. The coherent receiver 152 outputs a four-series reception signal (electric signals) being equivalent to the I component and the Q component of the X polarization and the Y polarization being subject to coherent detection. The coherent receiver 152 corresponds to the detector 21 illustrated in FIG. 2.

The ADC 153 samples the reception signal output from the coherent receiver 152 and converts the reception signal into a signal in a digital domain. The equalization unit 154 performs receiver side equalization signal processing on the four-series reception signal being sampled by the ADC 153. The equalization unit 154 performs equalization signal processing on the reception signal, and thereby compensates for various pieces of distortions in the optical fiber communication system. The decoding unit 155 decodes the signal being subject to the equalization signal processing by the equalization unit 154, and restores the transmitted data. The decoding unit 155 outputs the restored data to not-illustrated another circuit.

Figure 4:
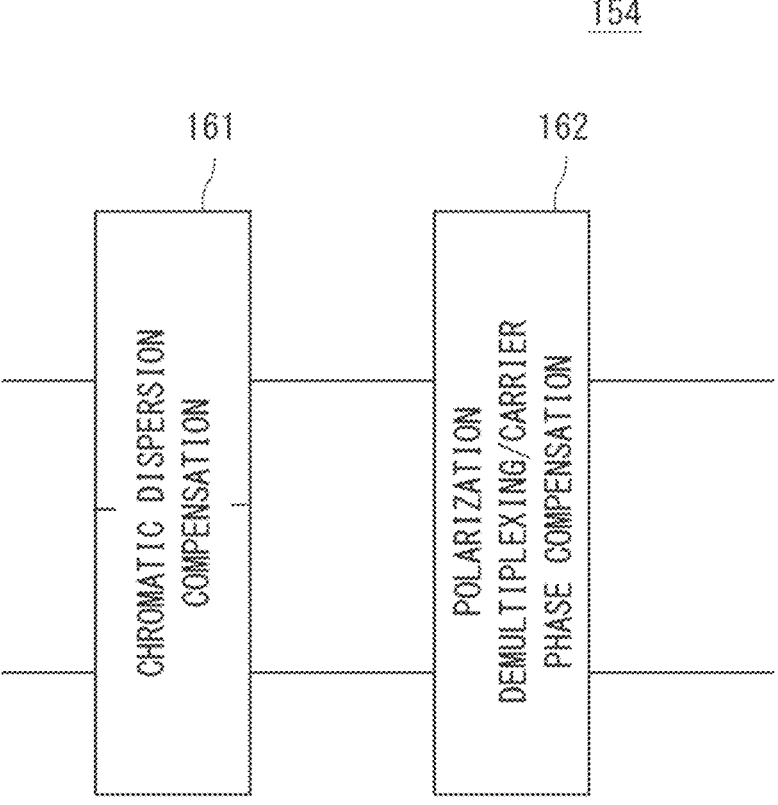
FIG. 4 is a block diagram illustrating an example of digital signal processing in an equalization unit.

FIG. 4 illustrates an example of digital signal processing in the equalization unit 154. The equalization unit 154 includes a chromatic dispersion compensation 161 and a polarization demultiplexing/carrier phase compensation 162. The equalization unit 154 may be configured as any digital signal processing circuit. The equalization unit 154 is input a two-series complex signal acquired by converting a sampled four-series reception signal into a complex phasor display for each polarization. The chromatic dispersion compensation 161 performs chromatic dispersion compensation for each polarization. The chromatic dispersion compensation 161 includes a fixed or quasi-static filter whose filter coefficient is determined in such a way as to compensate for chromatic dispersion accumulated in an optical transmission path.

The polarization demultiplexing/carrier phase compensation 162 is input a two-series complex signal associated to each of the polarization subjected to chromatic dispersion compensation by the chromatic dispersion compensation 161. The polarization demultiplexing/carrier phase compensation 162 performs polarization demultiplexing and carrier phase compensation on the input two-series complex signal. A change in a polarization state occurring in the optical transmission path varies with time due to minute pressure to an optical fiber and a temperature change. For this reason, a filter for compensating for the change in the polarization state needs to be adaptively controlled. The equalization signal processing circuit according to the present example embodiment is used for polarization demultiplexing/carrier phase compensation 162. Note that, a method described in the present example embodiment can be extended and applied to a case where linear and nonlinear distortion occurring in the optical transmitter 110 and the optical receiver 150 is subjected to adaptive equalization by using a nonlinear filter represented by a widely linear filter or a Volterra filter.

Figure 5:
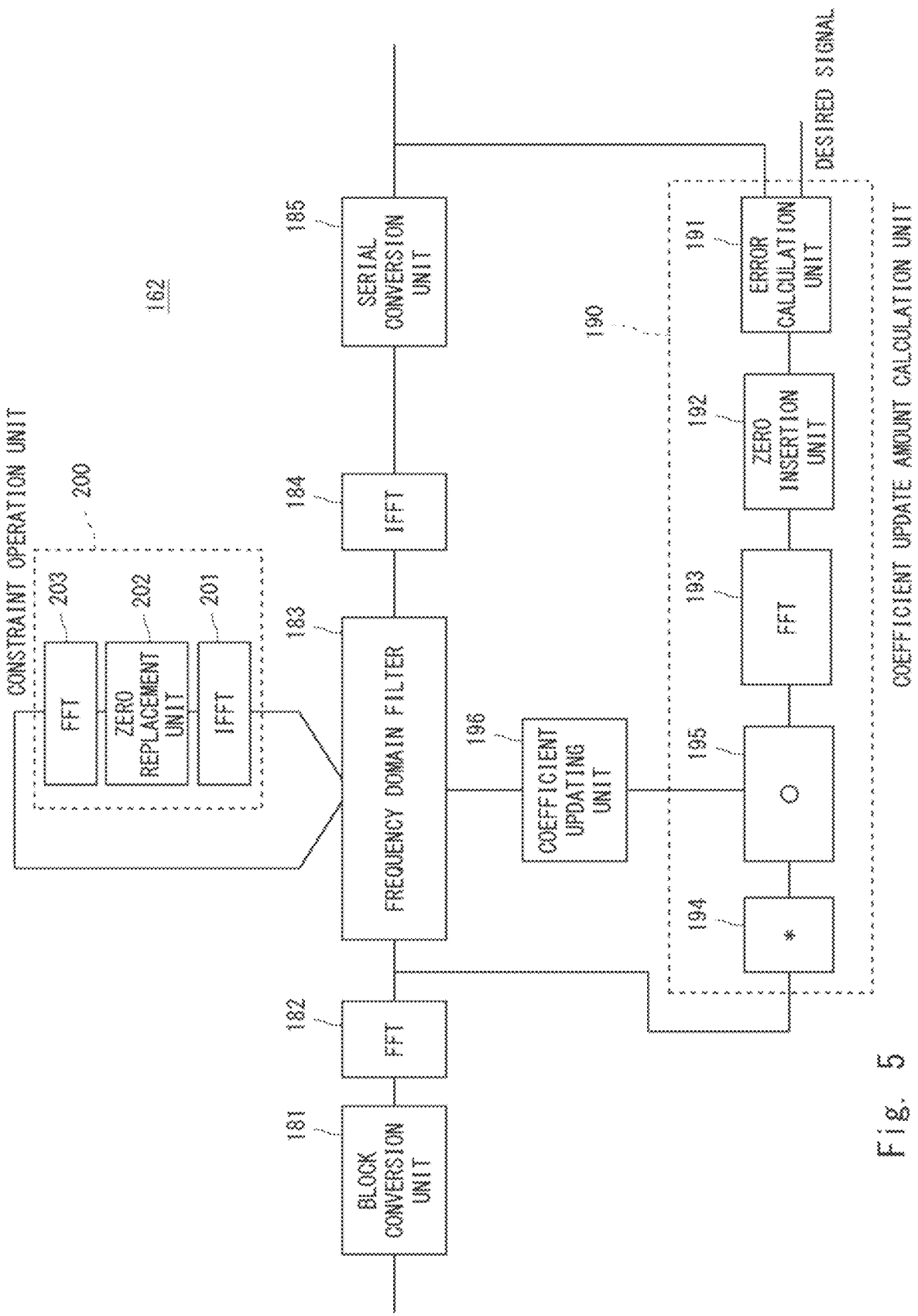
FIG. 5 is a block diagram illustrating a configuration example of polarization demultiplexing/carrier phase compensation.

FIG. 5 illustrates a configuration example of the polarization demultiplexing/carrier phase compensation 162. The polarization demultiplexing/carrier phase compensation 162 includes a block conversion unit 181, an FFT 182, a frequency domain filter 183, an IFFT 184, a serial conversion unit 185, a coefficient update amount calculation unit 190, a coefficient updating unit 196, and a constraint operation unit 200. The polarization demultiplexing/carrier phase compensation 162 corresponds to the equalization signal processing circuit 22 illustrated in FIG. 2. For example, the polarization demultiplexing/carrier phase compensation 162 being an equalization signal processing circuit may be configured as a circuit including one or more processors and one or more memories. In this case, at least a part of a function of each unit in the polarization demultiplexing/carrier phase compensation 162 can be achieved by the processor reading and executing a program stored in the memory. Operation of the polarization demultiplexing/carrier phase compensation 162 is also referred to as an equalization signal processing method.

Note that, in FIG. 5, compensation in the polarization demultiplexing/carrier phase compensation 162 is performed by using a 2×2 adaptive MIMO filter, but for the sake of simplicity, FIG. 5 describes an example of a case where an input/output is a one-series complex signal. A signal being input to the polarization demultiplexing/carrier phase compensation 162 is, for example, a complex signal sequence of two-times oversampling. Operation described below can be easily extended to the adaptive MIMO filter.

The block conversion unit 181 performs serial/block conversion on an input signal in the time domain while providing a constant overlap between blocks for conversion to the frequency domain. An overlap ratio may be set to, for example, 50%. The FFT 182 is a frequency domain conversion unit, and converts a blocked input signal into a signal in the frequency domain. The frequency domain filter 183 performs filtering processing on an input signal in the frequency domain. In the filtering processing, the frequency domain filter 183 multiplies an input signal by a filter coefficient for each frequency. The frequency domain filter 183 corresponds to the frequency domain filter 23 illustrated in FIG. 2.

The IFFT 184 is a time domain conversion unit, and converts a frequency domain signal being output from the frequency domain filter 183 into a block signal in the time domain. The serial conversion unit 185 converts the block signal in the time domain converted by the IFFT 184 into a serial signal in the time domain. In the conversion into a serial signal, the serial conversion unit 185 leaves only a domain not being affected by the wraparound at both ends of the block in the block signal in the time domain, and removes the others.

Note that, although omitted in FIG. 5, the equalization signal processing circuit may further include one or more filters for performing carrier phase compensation and frequency offset compensation on a signal in the time domain being subjected to the serial conversion. In addition, the equalization signal processing circuit may include a functional unit that performs down-sampling to one-time oversampling on an output signal in the time domain.

A filter coefficient of the frequency domain filter 183 is adaptively controlled by using an input/output signal of the filter. The coefficient update amount calculation unit 190 calculates a coefficient update amount with respect to the filter coefficient of the frequency domain filter 183, by using the input/output signal and a desired signal with respect to the output signal. Several pieces of algorithm are known for calculating the coefficient update amount, such as constant modulus algorithm (CMA) and data-aided LMS, depending on a criterion for controlling the filter coefficient. Herein, an example in which data-aided LMS is used will be described. It is assumed that an input signal to the frequency domain filter 183 is a signal of two-times oversampling, and an output signal y is also a time domain signal of two-times oversampling.

The coefficient update amount calculation unit 190 includes an error calculation unit 191, a zero insertion unit 192, an FFT 193, a complex conjugate calculation unit 194, and an Hadamard product calculation unit 195. The error calculation unit 191 calculates an error being a difference between an output signal and a desired state. When an input signal to the frequency domain filter 183 is two-times oversampling and y is a time domain signal of two-times oversampling, a desired state d is expressed by the following equation 18.

$$d[k] = \begin{cases} \text{desired symbol} & (k\text{: symbol timings}) \\ 0 & (k\text{: transition timings}) \end{cases} \tag{18}$$

The error calculation unit 191 calculates an error e being a difference between the output signal y and the desired state d by the following equation 19.

$$e = d - y \tag{19}$$

The zero insertion unit 192 concatenates a zero vector having the same magnitude as y˜ to the above error e, and outputs a vector (e 0)$^T$. The FFT 193 multiplies the vector (e 0)$^T$ by a DFT matrix D, and converts an error signal vector into a signal D(e 0)$^T$ in the frequency domain.

Figure 8:
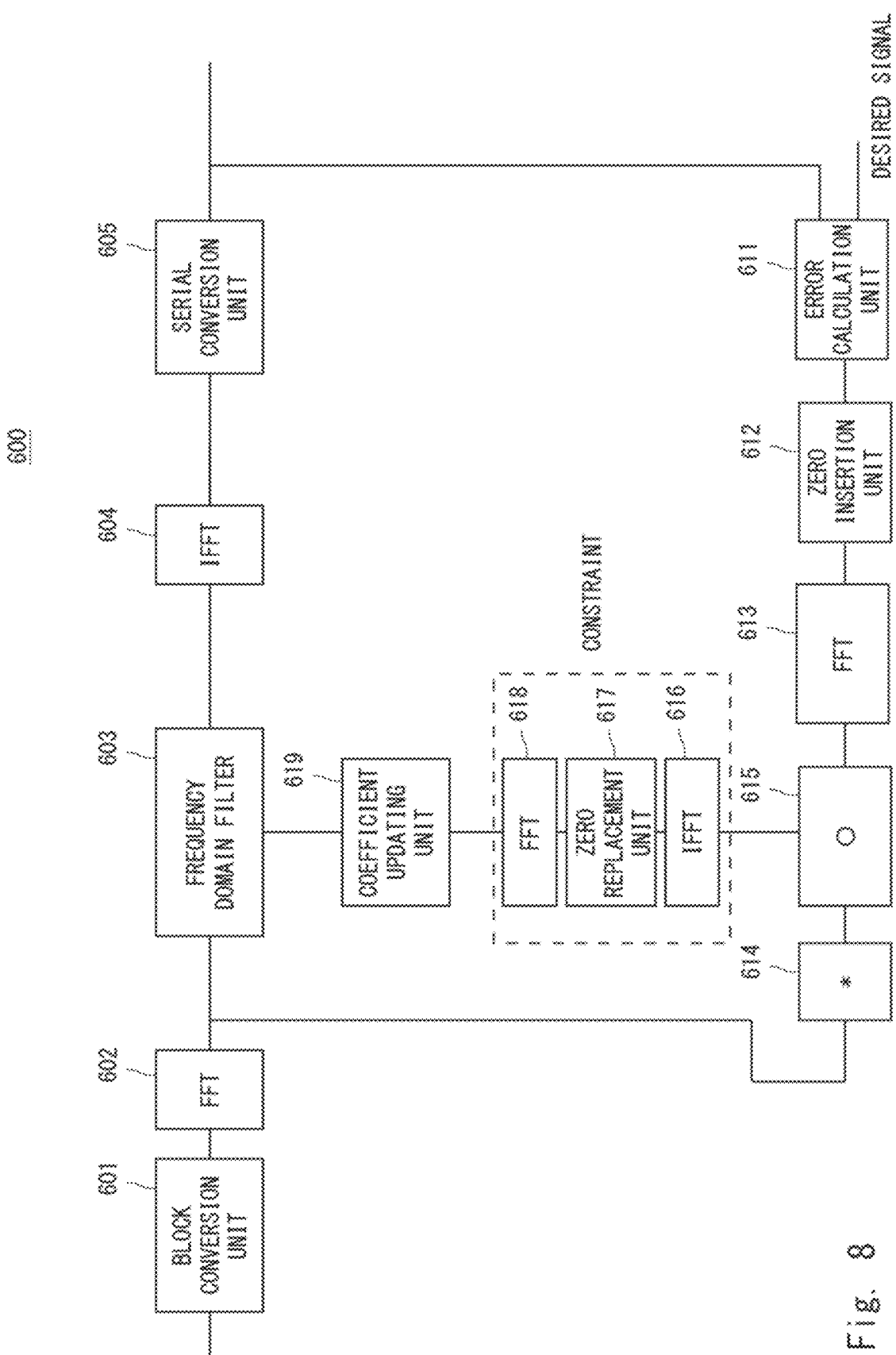
FIG. 8 illustrates an example of an adaptive frequency domain filter described in Non Patent Literature 1.

The complex conjugate calculation unit 194 calculates complex conjugate X* of an input frequency domain signal X being output from the FFT 182. The Hadamard product calculation unit 195 calculates an Hadamard product of the complex conjugate X* of the input frequency domain signal and the error signal vector converted into a signal in the frequency domain by the FFT 193. The Hadamard product calculation unit 195 outputs a calculation result X*∘D(e 0)$^T$ of the Hadamard product to the coefficient updating unit 196. The calculation result of the Hadamard product becomes a coefficient update amount for a frequency domain filter coefficient H by a stochastic gradient descent method. The calculation of the coefficient update amount may be similar to the calculation of the coefficient update amount in the adaptive frequency domain filter 600 illustrated in FIG. 8.

The coefficient updating unit 196 multiplies the coefficient update amount by a predetermined step size a, and updates the filter coefficient of the frequency domain filter 183. The coefficient update of the frequency domain filter 183 is expressed by the following expression 20.

$$H \to H + 2\alpha X^* \circ D \begin{pmatrix} e \\ 0 \end{pmatrix} \tag{20}$$

The coefficient update amount calculation unit 190 and the coefficient updating unit 196 correspond to the coefficient updating unit 24 illustrated in FIG. 2.

Herein, a constraint in such a way as not to be affected by distortion caused by the wraparound from both ends of a block to an output signal is that H is frequency domain representation of (h 0)$^T$. In view of such circumstances, in the present example embodiment, an operation of imposing a constraint on the coefficient itself instead of on the coefficient update amount is performed. By imposing a constraint on the coefficient update amount every time the coefficient is updated, it is also possible to satisfy a constraint that H is frequency domain representation of (h 0)$^T$, i.e., an appropriate part of the time domain representation of the frequency domain filter coefficient is zero. However, the same can be achieved even when a constraint that an appropriate part of the time domain representation is zero is imposed on the filter coefficient itself of the frequency domain filter 183.

An operation of the constraint on the coefficient update amount is performed at a high frequency, for example, every coefficient update. This is because the coefficient update amount is small every time, and therefore, it is not very effective even when the operation of the constraint is performed at a low frequency. When the operation of the constraint is performed at a low frequency, an effect that the constraint on the coefficient update amount is not satisfied continues to be accumulated. Meanwhile, the constraint on the filter coefficient H itself becomes in a situation that, even when performing at a low frequency, an appropriate part of the time domain representation of the frequency domain filter coefficient is zero every time the constraint is imposed. Therefore, it is effective to impose the constraint at a low frequency. In addition, when the frequency domain filter 183 is a MIMO filter, instead of simultaneously imposing the constraint on the coefficient update amount of each filter of the MIMO filter at a time of each coefficient update, in this configuration, it is also possible to sequentially impose the constraint on the coefficient of each filter of the MIMO filter at different timing. This eliminates the need to handle with the constraint on each filter of the MIMO filter at the same time, thus a calculation amount is reduced.

In the present example embodiment, the constraint operation unit 200 performs an operation of a constraint on the filter coefficient of the frequency domain filter 183 in such a way as not to be affected by distortion caused by wraparound from both ends of a block to an output signal. The constraint operation unit 200 includes an IFFT 201, a zero replacement unit 202, and an FFT 203. The constraint operation unit 200 corresponds to the constraint operation unit 25 illustrated in FIG. 2.

The IFFT 201 converts the filter coefficient H of the frequency domain filter 183 into a coefficient in the time domain. The zero replacement unit 202 replaces, with zero, an appropriate domain of the coefficient converted into the time domain, i.e., a domain that causes wraparound at both ends of a block of an input signal not being removed by the overlap-save method. The FFT 203 converts the coefficient in the time domain in which the appropriate domain is replaced with zero into a filter coefficient in the frequency domain. The frequency domain filter 183 performs filtering processing by using the filter coefficient converted by the FFT 203. The operation of the constraint can be expressed by the following expression 21 by using c indicated in the equation 17 described above.

$$H \to Dc \circ \left( D^{-1} H \right) \tag{21}$$

In the present example embodiment, updating of the filter coefficient of the frequency domain filter 183 is performed for each of a first predetermined number of blocks of an input signal by using the expression 20 described above. In contrast, the operation of the constraint on the filter coefficient is performed for each of a second predetermined number of blocks of the input signal. Herein, the second predetermined number is larger than the first predetermined number. For example, the first predetermined number is 1, and updating of the filter coefficient of the frequency domain filter 183 is performed for each of blocks converted by the block conversion unit 181. On the other hand, the second predetermined number is equal to or more than 2, and the operation of the constraint on the filter coefficient is performed for each of a plurality of blocks.

In the present example embodiment, the operation of the constraint on the filter coefficient is performed at a frequency lower than the updating of the filter coefficient. When the operation of the constraint on the filter coefficient is performed at a frequency lower than a frequency of the updating of the filter coefficient, the number of IFFT and FFT associated with the operation of the constraint can be suppressed, and therefore, a calculation amount required for the coefficient update of the frequency domain filter 183 is reduced. In addition, in the present example embodiment, it is also possible to adjust a frequency of imposing the constraint according to an environment of a communication path.

The present inventor has verified operation of a receiver side adaptive equalization signal processing system according to the present example embodiment by simulation. In the simulation, single mode fiber (SMF) 6000 km transmission is simulated for a 32Gbaud polarization multiplexing quadrature phase shift keying (QPSK) signal. In the simulation, the QPSK signal is given chromatic dispersion being equivalent to SMF 6000 km and a random polarization rotation. In addition, an optical signal-to-noise ratio (OSNR) is set at 30 dB/0.1 nm. At a receiver, the QPSK signal is coherently received, and sampled with two-times oversampling. Line width of each of light sources on a transmitter side and a receiver side is set to 100 kHz, and a frequency offset of 100 kHz is given between the transmission light source and a reception light source which becomes a local oscillator.

A signal sampled with two-times oversampling is subjected to chromatic dispersion compensation for each polarization, and polarization demultiplexing, carrier phase compensation, and frequency offset compensation are performed by using an adaptive frequency domain 2×2MIMO filter. A size of an input signal block is set to 256, and an overlap size is set to 128. For adaptive coefficient control, data-aided LMS algorithm is used first, and the used algorithm is switched to decision-directed LMS algorithm after the filter coefficient is approximately converged. The adaptive frequency domain filter uses a configuration that performs carrier phase compensation and frequency offset compensation on an output signal of the frequency domain filter converted into the time domain. In addition, a phase-locked loop (PLL) scheme is used for carrier phase compensation and frequency offset compensation.

Figure 6:
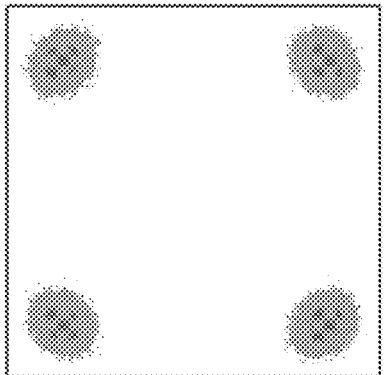
FIG. 6 is a constellation diagram illustrating a simulation result in a case where an operation of a constraint is performed on a filter coefficient of a frequency domain filter.

FIG. 6 is a constellation of adaptive frequency domain filter output signals acquired by the above simulation in a case where an operation of a constraint is performed on the filter coefficient of the frequency domain filter. The present inventor has evaluated the constellation of the adaptive frequency domain filter output signals, after the algorithm used for adaptive coefficient control is switched to the decision-directed LMS algorithm and then the filter coefficient is sufficiently converged.

Figure 7:
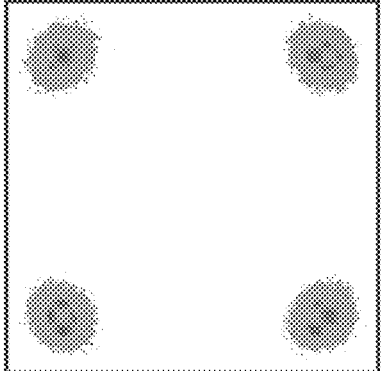
FIG. 7 is a constellation diagram illustrating a simulation result in a case where an operation of a constraint is performed on a coefficient update amount.

In addition, as a comparative example, the present inventor has performed a simulation under the above condition also in a case where the operation of the constraint is performed for each block on the coefficient update amount. FIG. 7 is a constellation of adaptive frequency domain filter output signals acquired by the simulation in a case where the operation of the constraint is performed on the coefficient update amount. In the comparative example, update of a coefficient having a constraint imposed on each block is performed. In contrast, the operation of the constraint on the filter coefficient of the frequency domain filter is performed at a frequency of 1 in 10 blocks. Note that, each of FIGS. 6 and 7 illustrates a constellation of X polarization signal.

As comparison between FIG. 6 and FIG. 7, it can be seen that a good constellation of the QPSK signals is acquired in both cases. From a result of the simulation, it can be confirmed that, even when a frequency of performing the operation of the constraint is ¹⁄₁₀, a comparable characteristic can be acquired as compared with a case of performing coefficient update in which the constraint is imposed for each block.

Figure 9:
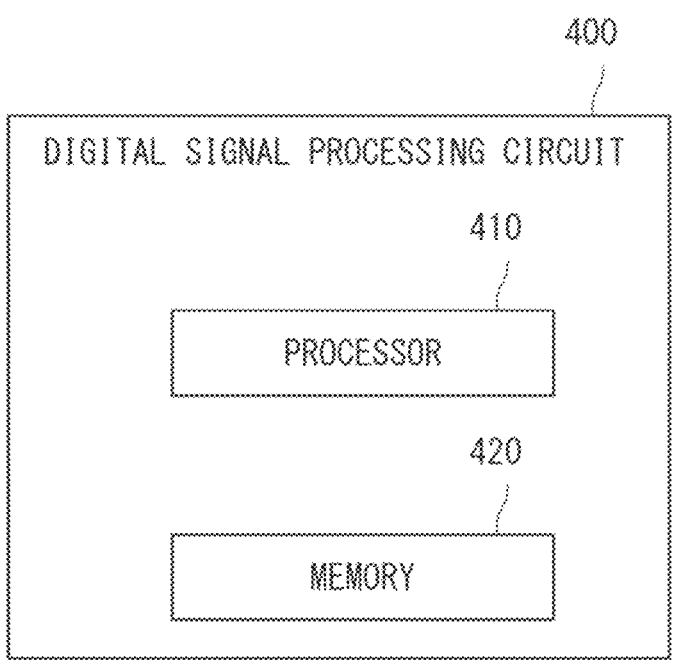
FIG. 9 is a block diagram illustrating a configuration example of a digital signal processing circuit.

In the above example embodiment, the equalization unit 154 may be configured by using any digital signal processing circuit. FIG. 9 illustrates a configuration example of a digital signal processing circuit that may be used as the equalization unit 154. A digital signal processing circuit 400 is configured as a circuit including one or more processors 410 and one or more memories 420. In the digital signal processing circuit 400, one or more processors 410 read a program stored in one or more memories 420, execute processing on the read program, and thereby perform receiver side equalization signal processing.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a Compact Disc (CD), a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

A communication system, a receiver, an equalization signal processing circuit, an equalization signal processing method, and a program according to the present disclosure can reduce a calculation amount required for performing coefficient update of an adaptive frequency domain filter while suppressing an effect of distortion caused by wrap-around from both ends of a block to an output signal.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. Each example embodiment can be appropriately combined with at least one of example embodiments.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

For example, some or all of the above-described example embodiments may be described as the following supplementary notes, but are not limited to the following.

[Supplementary Note 1]

An equalization signal processing circuit including:

a frequency domain filter configured to multiply an input signal in a frequency domain being blocked by an overlap-save method by a coefficient for each frequency;

a coefficient updating unit configured to adaptively update a filter coefficient of the frequency domain filter, based on an input signal to the frequency domain filter and an output signal of the equalization signal processing circuit, and a predetermined state of the output signal of the equalization signal processing circuit; and a constraint operation unit configured to perform an operation of a constraint on a filter coefficient of the frequency domain filter in such a way as not to be affected by distortion caused by wraparound from both ends of a block to the output signal, wherein a frequency at which the constraint operation unit performs the operation of the constraint is lower than a frequency at which the coefficient updating unit adaptively updates the filter coefficient.

[Supplementary Note 2]

The equalization signal processing circuit according to supplementary note 1, wherein the constraint operation unit converts a filter coefficient of the frequency domain filter into a filter coefficient in a time domain, replaces, with zero, a domain of the filter coefficient converted into the time domain that causes wraparound at both ends of a block of an input signal not being removed by an overlap-save method, converts a filter coefficient in a time domain having been replaced with zero into a filter coefficient in a frequency domain, and sets the converted filter coefficient in the frequency domain to a frequency domain filter.

[Supplementary Note 3]

The equalization signal processing circuit according to supplementary note 1 or 2, wherein the coefficient updating unit includes a coefficient update amount calculation unit configured to calculate a coefficient update amount of the frequency domain filter, based on an input signal to the frequency domain filter and an output signal of the equalization signal processing circuit, and a predetermined state of the output signal of the equalization signal processing circuit.

[Supplementary Note 4]

The equalization signal processing circuit according to any one of supplementary notes 1 to 3, further including:

a block conversion unit configured to block the input signal while providing a constant overlap between blocks;

a frequency domain conversion unit configured to convert the blocked input signal into a signal in a frequency domain, and outputting the converted signal to the frequency domain filter;

a time domain conversion unit configured to convert a blocked signal in a frequency domain output by the frequency domain filter into a signal in a time domain; and a serial conversion unit configured to leave a domain of the signal in the time domain converted by the time domain conversion unit that does not cause wraparound at both ends of a block of the input signal, remove a domain that causes wraparound at both ends of a block of the input signal, and then convert a signal converted into a signal in a time domain by the time domain conversion unit into a serial signal.

[Supplementary Note 5]

The equalization signal processing circuit according to any one of supplementary notes 1 to 4, wherein the coefficient updating unit updates a filter coefficient of the frequency domain filter for each of a first predetermined number of blocks of the input signal, the constraint operation unit performs the operation of the constraint for each of a second predetermined number of blocks of the input signal, and the second predetermined number is larger than the first predetermined number.

[Supplementary Note 6]

The equalization signal processing circuit according to any one of supplementary notes 1 to 5, wherein the input signal is a signal acquired by coherently receiving a signal transmitted through a transmission path by a receiver.

[Supplementary Note 7]

The equalization signal processing circuit according to supplementary note 6, wherein the input signal is a polarization multiplexed signal, and the frequency domain filter compensates for a change in a polarization state in the transmission path.

[Supplementary Note 8]

The equalization signal processing circuit according to any one of supplementary notes 1 to 7, wherein the frequency domain filter is a multi-input multi-output (MIMO) filter.

[Supplementary Note 9]

A receiver including:

a detector configured to coherently receive a signal being transmitted from a transmitter via a transmission path; and an equalization signal processing circuit configured to perform equalization signal processing on the coherently received input signal, wherein the equalization signal processing circuit includes a frequency domain filter configured to multiply the input signal in a frequency domain being blocked by an overlap-save method by a coefficient for each frequency, a coefficient updating unit configured to adaptively update a filter coefficient of the frequency domain filter, based on an input signal to the frequency domain filter and an output signal of the equalization signal processing circuit, and a predetermined state of the output signal of the equalization signal processing circuit, and a constraint operation unit configured to perform an operation of a constraint on a filter coefficient of the frequency domain filter in such a way as not to be affected by distortion caused by wraparound from both ends of a block to the output signal, wherein a frequency at which the constraint operation unit performs the operation of the constraint is lower than a frequency at which the coefficient updating unit adaptively updates the filter coefficient.

[Supplementary Note 10]

The receiver according to supplementary note 9, wherein the constraint operation unit converts a filter coefficient of the frequency domain filter into a filter coefficient in a time domain, replaces, with zero, a domain of the filter coefficient converted into the time domain that causes wraparound at both ends of a block of an input signal not being removed by an overlap-save method, converts a filter coefficient in a time domain having been replaced with zero into a filter coefficient in a frequency domain, and sets the converted filter coefficient in the frequency domain to a frequency domain filter.

[Supplementary Note 11]

The receiver according to supplementary note 9 or 10, wherein the coefficient updating unit includes a coefficient update amount calculation unit configured to calculate a coefficient update amount of the frequency domain filter, based on an input signal to the frequency domain filter and an output signal of the equalization signal processing circuit, and a predetermined state of the output signal of the equalization signal processing circuit.

[Supplementary Note 12]

A communication system including:

a transmitter configured to transmit a signal via a transmission path; and

US 12,592,782 B2

19

20 a receiver configured to receive the transmitted signal,
wherein the receiver includes
a detector configured to coherently receive a signal being
transmitted from the transmitter, and
an equalization signal processing circuit configured to
perform equalization signal processing on the coher-
ently received input signal, the equalization signal
processing circuit includes
a frequency domain filter configured to multiply the input
signal in a frequency domain being blocked by an
overlap-save method by a coefficient for each fre-
quency,
a coefficient updating unit configured to adaptively update
a filter coefficient of the frequency domain filter, based
on an input signal to the frequency domain filter and an
output signal of the equalization signal processing
circuit, and a predetermined state of the output signal of
the equalization signal processing circuit, and
a constraint operation unit configured to perform an
operation of a constraint on a filter coefficient of the
frequency domain filter in such a way as not to be
affected by distortion caused by wraparound from both
ends of a block to the output signal,
wherein a frequency at which the constraint operation unit
performs the operation of the constraint is lower than a
frequency at which the coefficient updating unit adap-
tively updates the filter coefficient.
[Supplementary Note 13]
The communication system according to supplementary
note 12, wherein the constraint operation unit converts a
filter coefficient of the frequency domain filter into a filter
coefficient in a time domain, replaces, with zero, a domain
of the filter coefficient converted into the time domain that
causes wraparound at both ends of a block of an input signal
not being removed by an overlap-save method, converts a
filter coefficient in a time domain having been replaced with
zero into a filter coefficient in a frequency domain, and sets
the converted filter coefficient in the frequency domain to a
frequency domain filter.
[Supplementary Note 14]
The communication system according to supplementary
note 12 or 13, wherein the coefficient updating unit includes
a coefficient update amount calculation unit configured to
calculate a coefficient update amount of the frequency
domain filter, based on an input signal to the frequency
domain filter and an output signal of the equalization signal
processing circuit, and a predetermined state of the output
signal of the equalization signal processing circuit.
[Supplementary Note 15]
An equalization signal processing method of performing
equalization signal processing, the equalization signal pro-
cessing including:
multiplying an input signal in a frequency domain being
blocked by an overlap-save method by a coefficient for each
frequency in a frequency domain filter;
adaptively updating a filter coefficient of the frequency
domain filter, based on an input signal to the frequency
domain filter and an output signal of the equalization signal
processing, and a predetermined state of the output signal of
the equalization signal processing; and
performing an operation of a constraint on a filter coef-
ficient of the frequency domain filter at a frequency
lower than a frequency at which the filter coefficient is
adaptively updated, in such a way as not to be affected
by distortion caused by wraparound from both ends of
a block to the output signal.

[Supplementary Note 16]
A program for causing a processor to execute equalization
signal processing, the equalization signal processing includ-
ing:
multiplying an input signal in a frequency domain being
blocked by an overlap-save method by a coefficient for each
frequency in a frequency domain filter;
adaptively updating a filter coefficient of the frequency
domain filter, based on an input signal to the frequency
domain filter and an output signal of the equalization signal
processing, and a predetermined state of the output signal of
the equalization signal processing; and
performing an operation of a constraint on a filter coef-
ficient of the frequency domain filter at a frequency
lower than a frequency at which the filter coefficient is
adaptively updated, in such a way as not to be affected
by distortion caused by wraparound from both ends of
a block to the output signal.
What is claimed is:
1. An equalization signal processing circuit comprising:
at least one memory storing instructions, and
at least one processor configured to execute the instruc-
tions to:
input, in a frequency domain filter, an input signal in a
frequency domain being blocked by an overlap-save
method, and multiply the input signal in the frequency
domain by a coefficient for each frequency;
adaptively update a filter coefficient of the frequency
domain filter, based on an input signal to the frequency
domain filter and an output signal of the equalization
signal processing circuit, and a predetermined state of
the output signal of the equalization signal processing
circuit; and
perform an operation of a constraint on a filter coefficient
of the frequency domain filter in such a way as not to
be affected by distortion caused by wraparound from
both ends of a block to the output signal,
wherein a frequency at which the operation of the con-
straint is performed is lower than a frequency at which
the filter coefficient is adaptively updated.
2. The equalization signal processing circuit according to
claim 1, wherein the operation of the constraint includes
converting a filter coefficient of the frequency domain filter
into a filter coefficient in a time domain, replacing, with zero,
a domain of the filter coefficient converted into the time
domain that causes wraparound at both ends of a block of an
input signal not being removed by an overlap-save method,
converting a filter coefficient in a time domain having been
replaced with zero into a filter coefficient in a frequency
domain, and setting the converted filter coefficient in the
frequency domain to a frequency domain filter.
3. The equalization signal processing circuit according to
claim 1, the at least one processor is configured to execute
the instructions to calculate a coefficient update amount of
the frequency domain filter, based on an input signal to the
frequency domain filter and an output signal of the equal-
ization signal processing circuit, and a predetermined state
of the output signal of the equalization signal processing
circuit.
4. The equalization signal processing circuit according to
claim 1, the at least one processor is configured to execute
the instructions to:
block the input signal while providing a constant overlap
between blocks;
convert the blocked input signal into a signal in a fre-
quency domain, and output the converted signal to the
frequency domain filter;

convert a blocked signal in a frequency domain being output by the frequency domain filter into a signal in a time domain; and leave a domain of the signal in the time domain that does not cause wraparound at both ends of a block of the input signal, remove a domain that causes wraparound at both ends of a block of the input signal, and then convert a signal converted into a signal in a time domain into a serial signal.

5. The equalization signal processing circuit according to claim 1, the at least one processor is configured to execute the instructions to:

update a filter coefficient of the frequency domain filter for each of a first predetermined number of blocks of the input signal; and perform the operation of the constraint for each of a second predetermined number of blocks of the input signal, wherein the second predetermined number is larger than the first predetermined number.

6. The equalization signal processing circuit according to claim 1, wherein the input signal is a signal acquired by coherently receiving a signal transmitted through a transmission path by a receiver.

7. The equalization signal processing circuit according to claim 6, wherein the input signal is a polarization multiplexed signal, and the frequency domain filter compensates for a change in a polarization state in the transmission path.

8. The equalization signal processing circuit according to claim 1, wherein the frequency domain filter is a multi-input multi-output (MIMO) filter.

9. A receiver comprising:

a detector configured to coherently receive a signal being transmitted from a transmitter via a transmission path; and the equalization signal processing circuit according to claim 1.

10. The receiver according to claim 9, wherein the operation of the constraint includes converting a filter coefficient of the frequency domain filter into a filter coefficient in a time domain, replacing, with zero, a domain of the filter coefficient converted into the time domain that causes wraparound at both ends of a block of an input signal not being removed by an overlap-save method, converting a filter coefficient in a time domain having been replaced with zero into a filter coefficient in a frequency domain, and setting the converted filter coefficient in the frequency domain to a frequency domain filter.

11. The receiver according to claim 9, the at least one processor is configured to execute the instructions to calculate a coefficient update amount of the frequency domain filter, based on an input signal to the frequency domain filter and an output signal of the equalization signal processing circuit, and a predetermined state of the output signal of the equalization signal processing circuit.

12. A communication system comprising:

a transmitter configured to transmit a signal via a transmission path; and the receiver according to claim 9.

13. The communication system according to claim 12, wherein the operation of the constraint includes converting a filter coefficient of the frequency domain filter into a filter coefficient in a time domain, replacing, with zero, a domain of the filter coefficient converted into the time domain that causes wraparound at both ends of a block of an input signal not being removed by an overlap-save method, converting a filter coefficient in a time domain having been replaced with zero into a filter coefficient in a frequency domain, and setting the converted filter coefficient in the frequency domain to a frequency domain filter.

14. The communication system according to claim 12, the at least one processor is configured to execute the instructions to calculate a coefficient update amount of the frequency domain filter, based on an input signal to the frequency domain filter and an output signal of the equalization signal processing circuit, and a predetermined state of the output signal of the equalization signal processing circuit.

15. An equalization signal processing method of performing equalization signal processing, the equalization signal processing including:

multiplying an input signal in a frequency domain being blocked by an overlap-save method by a coefficient for each frequency in a frequency domain filter;

adaptively updating a filter coefficient of the frequency domain filter, based on an input signal to the frequency domain filter and an output signal of the equalization signal processing, and a predetermined state of the output signal of the equalization signal processing; and performing an operation of a constraint on a filter coefficient of the frequency domain filter at a frequency lower than a frequency at which the filter coefficient is adaptively updated, in such a way as not to be affected by distortion caused by wraparound from both ends of a block to the output signal.

16. A non-transitory computer readable medium storing a program for causing a processor to execute equalization signal processing, the equalization signal processing including:

multiplying an input signal in a frequency domain being blocked by an overlap-save method by a coefficient for each frequency in a frequency domain filter;

adaptively updating a filter coefficient of the frequency domain filter, based on an input signal to the frequency domain filter and an output signal of the equalization signal processing, and a predetermined state of the output signal of the equalization signal processing; and performing an operation of a constraint on a filter coefficient of the frequency domain filter at a frequency lower than a frequency at which the filter coefficient is adaptively updated, in such a way as not to be affected by distortion caused by wraparound from both ends of a block to the output signal.

* * * * *